July 28, 1970     A. B. DISMORE     3,522,151
DISTILLATION APPARATUS WITH SPRAY CHAMBER AND
AIR CIRCULATING MEANS
Filed Feb. 20, 1968     2 Sheets-Sheet 1
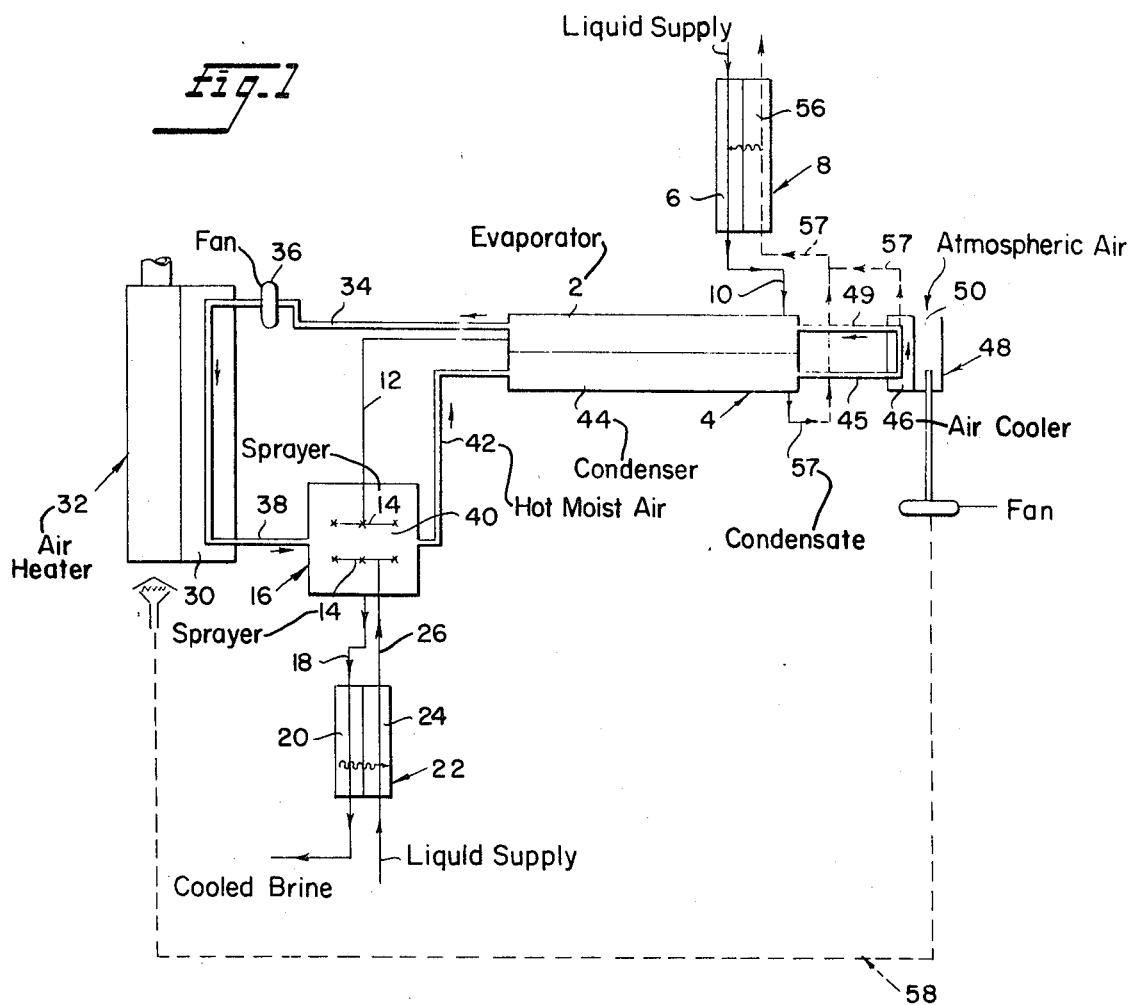
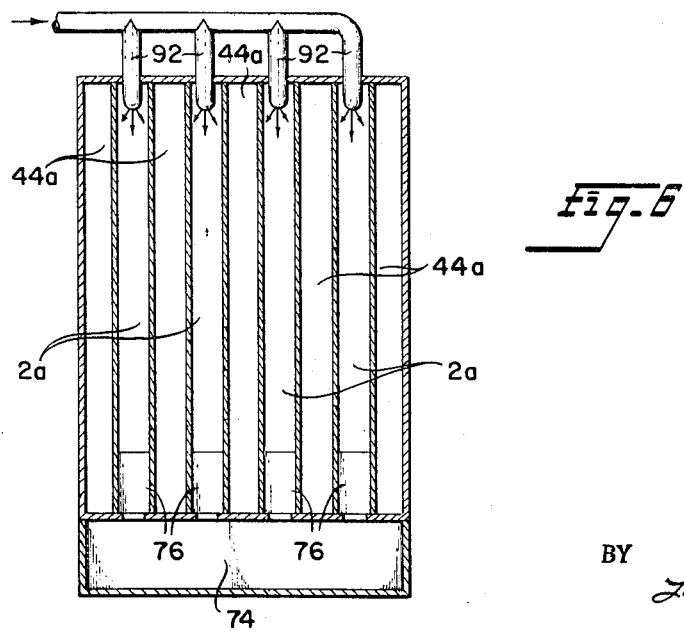
INVENTOR
Albert B. Dismore
BY
Lawrence E. Laubscher
ATTORNEY

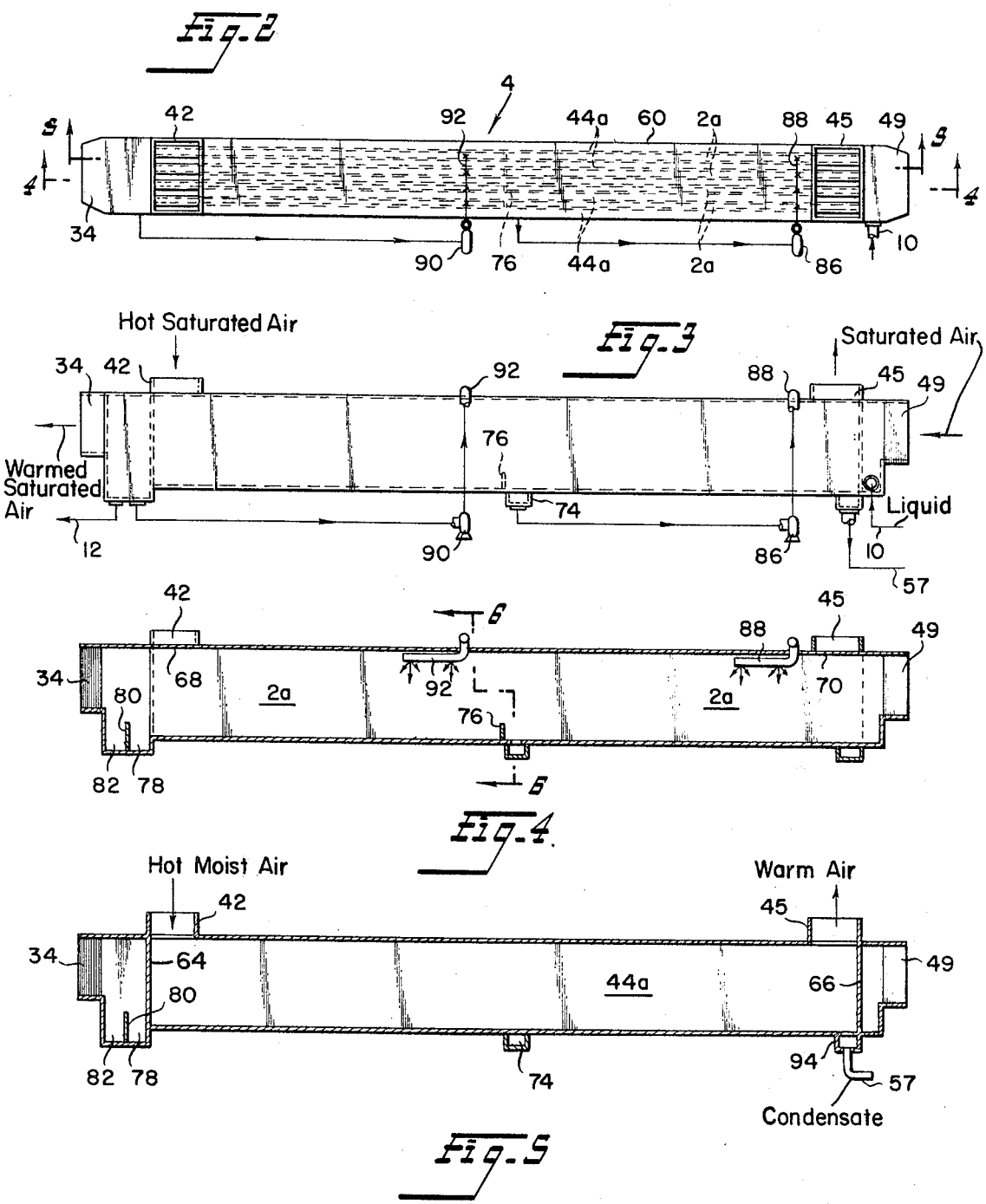

United States Patent Office 3,522,151
Patented July 28, 1970

3,522,151
DISTILLATION APPARATUS WITH SPRAY CHAMBER AND AIR CIRCULATING MEANS
Albert B. Dismore, 22 Prospect Heights, 1st Addition, Great Falls, Mont. 59401
Filed Feb. 20, 1968, Ser. No. 706,855
Int. Cl. B01d 1/14; C02b 1/06
U.S. Cl. 202—236                                      5 Claims

ABSTRACT OF THE DISCLOSURE

Distillation apparatus for purifying liquids, such as sea water, including improved heat exchanger means having evaporation chambers in which the liquid is evaporated, and condensation chambers in which liquid-saturated hot air is condensed, said chambers being in heat transfer relationship to effectively transfer the latent heat between the evaporating and condensing distillation steps.

---

Various types of raw water distillation and sea water desalination apparatus and methods have been proposed in the patented prior art, as evidenced, for example, by the patents to Coanda et al. No. 2,761,292 and Lichtenstein Nos. 3,214,348 and 3,214,351. While the known systems have proven to be generally satisfactory in operation, they possess certain drawbacks, such as the relatively large size, complexity and cost of the components as compared with the volume of purified water that can be produced in a given period of time, as well as the limited degree of purification that is achieved in many cases.

The present invention was developed to avoid the above and other drawbacks of the known systems and to provide an improved water distillation apparatus that is of economical construction and operation, and that affords an unusually large volume of distilled water relative to its size and operating costs.

The primary object of the present invention is to provide water distillation apparatus including evaporation chamber means for saturating atmospheric air with a liquid such as raw sea water, and condensation chamber means for condensing from the heated saturated air the purified liquid, said chambers being in heat exchanging relationship to effectively utilize the latent heat of the various distillation steps. In accordance with a characterizing feature of the invention, warm saturated air from the evaporation chamber means is further heated to a desired temperature by additional heater means and is passed through a spray curtain that consists of the excess spray liquid obtained from the evaporation chamber.

According to another object of the invention, the concentrated brine in the spray chamber is conducted in heat exchanging relationship with an additional supply of the liquid being sprayed in the spray chamber means, whereby the heat that would otherwise be wasted in the brine is conserved.

According to a further object of the invention, the atmospheric air supplied to the heater means is preliminarily heated by the hot or warm air exhausted from the condensation chambers. Furthermore, additional heat exchanger means may be provided for heating the liquid being supplied to the evaporation chamber by the hot condensate liquid.

Other objects and advantages of the invention will become apparent from a study of the following specification, when viewed in conjunction with the accompanying drawing, in which:

FIG. 1 is a schematic diagram of the distillation system;

FIGS. 2 and 3 are plan and side elevation views, respectively, of the evaporating and condensing heat exchanging apparatus;

FIGS. 4 and 5 are sectional views taken along line 4—4 and 5—5, respectively, in FIG. 2; and FIG. 6 is a sectional view taken along line 6—6 of FIG. 4.

Referring to FIG. 1, the cold liquid to be purified is fed to the evaporating chamber 2 of the main heat exchanger 4 via the heating chamber 6 of a preliminary heat exchanger 8 and supply conduit 10. The warmed liquid is conducted via conduit 12 to the spray means 14 of a spray chamber 16 the liquid output of which is connected with return via conduit 18 and the cooling chamber 20 of another heat exchanger 22. Additional liquid to be purified is also supplied to the spray means 14 via heating chamber 24 of heat exchanger 22, and supply conduit 26.

Evaporating chamber 2 includes an air outlet connected with the air heating chamber 30 of the air heater 32 via conduit 34 and draft producing fan 36, heated air from the heater being conducted via conduit 38 with the spray chamber 40 of the spray means 16, whereupon the hot saturated air is supplied via conduit 42 to the condensing chamber 44 of the heat exchanger 4. In accordance with the present invention, the hot saturated air transfers its latent heat to the evaporation chamber 2, and is then conducted through the cooling chamber 46 of an additional heat exchanger 48, and back to evaporating chamber 2 via conduit 49. Atmospheric air flows through the other chamber 50 of exchanger 48, and condensate from chambers 44 and 46 is fed through chamber 56 of heat exchanger 8 via conduit means 57. If desired, the heated air from heat exchanger 48 may be conducted via conduit 58 for use as the draft of the heater means 32.

Referring now to FIGS. 2–6, the heat exchanger 4 includes a housing 60 divided by vertical longitudinally-arranged partition means into a plurality of alternately arranged evaporating chambers 2a and condensing chambers 44a in heat exchanging relation. As shown in FIG. 4, the evaporating chambers 2a communicate at one end with the air inlet 49, and at the other end with the saturated air outlet 34. These inlet and outlet connections are isolated from the condensing passages 44 by the transverse partitions 64, 66 as shown in FIG. 5.

The condensing chambers 44a communicate at opposite ends with the hot saturated air inlet 42 and warm air outlet 45, respectively, said connections being isolated from the evaporating chambers 2a by the horizontal partitions 68 and 70 (FIG. 4). The fluid to be purified is supplied to the bottoms of chambers 2a via conduit 10, and fills a first well 74 (FIG. 4) and rises to the level of a first weir 76. When the liquid level exceeds this height, it spills over the first weir and begins to fill a second well 78. When the liquid level exceeds the height of the second weir 80, it spills over into a third well 82 for conduction to the spray chamber means 16 via conduit 12. As shown in FIGS. 3 and 4, fluid from the well 74 is pumped by a first pump 86 to downwardly-directed first stage spray means 88 mounted in the inlet ends of the evaporating chambers 2a. Similarly, fluid from the second well 78 is pumped by second pump means 90 to downwardly-directed second stage spray means 92 arranged in the central portions of the evaporating chambers 2a. The bottom portions of the condensing chambers 44a communicate with a fourth well 94 from which condensate is fed to the heat exchanger 8 via conduit 57.

OPERATION

Assuming that the liquid to be distilled and purified is salt water, the liquid is initially heated in the preliminary heat exchanger 8 and is fed to the first stage spray means 88 via conduit 10, well 74 and pump 86. The water is sprayed downwardly in the evaporating chambers 2a for mixing with the warm air, which air then becomes at least partially saturated. Some of the excess salt water is collected in well 74 for recirculation in the first stage, and other salt water spills over into the second stage for supply to the spray means 92 via well 78 and pump 90. During passage of the warm air through the second stage, it becomes substantially completely saturated for conveyance to the heater 32, the excess salt water being collected in well 78 for second stage recirculation.

Following passage through the heater, during which the temperature of the air is raised to any desired degree, the heated air is supplied to the spray means 16, whereupon it is sprayed through and is saturated by the sprayed warmed salt water received from the third well 82 of heat exchanger 4, and the additional salt water supplied via heat exchanger 22. The completely saturated hot air is now conducted to the condensing chambers 44a of the heat exchanger 4, whereupon condensation takes place in heat exchange relationship with the evaporating side of the heat exchanger. Excess salt water from spray chamber 16, now a concentrated brine due to evaporation in the chamber, passes through heat exchanger 22, and the cooled concentrated brine is either wasted or retained for further processing as desired.

As the stream passes from the condensing side to the evaporating side of heat exchanger 4, it flows through heat exchanger 50, where it comes into heat exchanging relationship with air at atmospheric temperature and is further cooled, causing additional condensation. This condensate is added to that from heat exchanger 4, and is conducted via conduit means 57 through heat exchanger 8. The warmed air from heat exchanger 48 is conducted to heater 32 for use as the combustion air for the heater, if desired.

From the above description, it is apparent that heat exchanger 4 may be operated through any temperature range desired, the high temperature being that of the hot saturated air from spray chamber 16, and the low temperature that of the cooled air from heat exchanger 48. The most efficient operation from the standpoint of heat utilization is with the largest practical temperature range and a large number of stages, while operation in a smaller temperature range near the upper temperature limits result in relatively high condensate production from smaller equipment.

While in accordance with the provisions of the patent statutes I have illustrated and described the best forms and embodiments of the invention now known to me, it will be apparent to those skilled in the art that various modifications may be made in the apparatus described without deviating from the invention.

What is claimed is:

1. Distillation apparatus for purifying a liquid, comprising
   (1) first heat exchanger means (4) for heating the liquid to be purified and including evaporating (2) and condensing (44) chambers in heat exchange relationship, said evaporating chamber including a liquid inlet adapted for connection with a source of said liquid and a liquid outlet;
   (2) a spray chamber (16) including spray means (14) therein, conduit means connecting said liquid outlet of the evaporating chamber with said spray means for conducting unevaporated liquid from the evaporating chamber to the spray chamber, said evaporating chamber including an outlet for withdrawing air from the upper section of said evaporating chamber;
   (3) air heater means (32) connected to said air outlet of the evaporating chamber for heating air withdrawn from the evaporating chamber to a given temperature; and
   (4) air circulating means for initially passing the heated air withdrawn from said evaporating chamber through said spray means to saturate the heated air with said liquid spray, and for subsequently passing the saturated heated air through said condensation chamber to produce condensate and to transfer to the evaporation chamber the latent heat of said saturated heated air.

2. Apparatus as defined in claim 1 and further including a second heat exchanger means (48) connected between said condensing chamber air outlet and said evaporating chamber air inlet for cooling the heated saturated air and cooperating with said evaporating chamber (2), said air heater means (32), said spray means (16) and said condensing chamber (44) to define a closed air path.

3. Apparatus as defined in claim 1, wherein said spray means includes a liquid outlet;
   and further including third heat exchanger means (22) operable to supply to said spray means additional liquid to be purified in cooling heat exchange relationship with the liquid delivered from said spray means.

4. Apparatus as defined in claim 1, wherein said condensing chamber includes a liquid outlet;
   and further including fourth heat exchanger means (8) for supplying the liquid to be purified to said evaporating chamber (2) in heat exchanger relationship with the liquid withdrawn from the said condensing chamber liquid outlet.

5. Distillation apparatus for purifying a liquid, comprising first heat exchanger means including a housing, a plurality of longitudinal parallel spaced vertical partitions dividing said housing into a plurality of evaporating (2a) and condensing (44a) chambers in heat exchange relationship, respectively, said housing including an outlet (12) for removing liquid from said evaporating chambers, a first air inlet (49) for supplying warm air to one end of said evaporating chambers, a first air outlet (34) for removing warm air from the other end of said evaporating chambers, a second air inlet (42) for supplying hot saturated air to said condensation chambers, a second air outlet (45) for withdrawing hot air from said condensation chambers, and a condensation outlet (57) for removing condensate from said condensation chambers, said housing including also longitudinally spaced first (74) and second (78) stage well means for collecting in stages in the bottom of the evaporating chambers the fluid to be purified, an inlet (10) for supplying the liquid to be purified to said well means, longitudinally-space first and second stage spray means (88, 92) for spraying liquid in stages in each of said evaporation chambers respectively, and first and second stage pump means (86, 90) for pumping to the first and second stage spray means the fluid in said first and second stage well means, respectively;
   air heater means (32) including an inlet connected with said evaporation chamber first air outlet, said air heater means including also an outlet;
   spray chamber means (16) including an air inlet connected with said heater outlet, an air outlet connected with said condensing chamber air inlet, a liquid outlet, and liquid spray means arranged in said spray chamber and connected with said evaporating chamber liquid outlet;

and air cooling heat exchanger means (48) including a first chamber having an inlet connected with the condensing chamber air outlet, and an outlet connected with the evaporating chamber air inlet, whereby the latent heat of the hot saturated air supplied to the condensation chamber is transferred to the evaporating chamber to evaporate the liquid supplied thereto.

References Cited

UNITED STATES PATENTS

| | | | |
|---|---|---|---|
| 3,214,348 | 10/1965 | Lichtenstein | 203—10 |
| 3,243,358 | 3/1966 | McCue | 202—236 |
| 3,248,306 | 4/1966 | Cummings | 202—236 X |
| 3,257,291 | 6/1966 | Gerber | 203—10 X |
| 3,284,318 | 11/1966 | Coanda et al. | 203—26 X |
| 3,317,406 | 5/1967 | Beard | 202—236 X |
| 3,334,026 | 8/1967 | Dobell | 203—10 |
| 3,425,914 | 2/1969 | Kanaan | 202—236 X |

FOREIGN PATENTS

K. 24,930  12/1956  Germany.

NORMAN YUDKOFF, Primary Examiner
F. E. DRUMMOND, Assistant Examiner

U.S. Cl. X.R.

203—10, 26, 49, 90